(12) United States Patent
Fiess et al.

(10) Patent No.: US 8,446,571 B2
(45) Date of Patent: May 21, 2013

(54) ADAPTIVE ANGLE AND POWER ADAPTATION IN 3D-MICRO-MIRROR LIDAR

(75) Inventors: Reinhold Fiess, Durbach (DE); Sascha Steinkogler, Freiburg (DE)

(73) Assignee: Robert Bosch GmbH, Stuttgart (DE)

( * ) Notice: Subject to any disclaimer, the term of this patent is extended or adjusted under 35 U.S.C. 154(b) by 754 days.

(21) Appl. No.: 12/620,426

(22) Filed: Nov. 17, 2009

(65) Prior Publication Data
US 2010/0165323 A1 Jul. 1, 2010

(30) Foreign Application Priority Data
Dec. 29, 2008 (DE) .......................... 10 2008 055 159

(51) Int. Cl.
*G01C 3/08* (2006.01)
(52) U.S. Cl.
USPC .......... 356/5.01; 356/3.01; 356/4.01; 356/5.1
(58) Field of Classification Search
USPC ................................ 356/4.01, 5.01; 701/301
See application file for complete search history.

(56) References Cited

U.S. PATENT DOCUMENTS

| | | | | |
|---|---|---|---|---|
| 5,957,984 | A * | 9/1999 | Rencken | 701/23 |
| 7,372,551 | B1 * | 5/2008 | Delfvett et al. | 356/5.15 |
| 8,149,388 | B2 * | 4/2012 | Kludas | 356/4.01 |
| 2002/0157887 | A1 * | 10/2002 | Sugawara et al. | 180/169 |
| 2004/0021923 | A1 * | 2/2004 | Hagelin et al. | 359/212 |
| 2006/0071578 | A1 * | 4/2006 | Drabe et al. | 310/309 |
| 2008/0215231 | A1 * | 9/2008 | Breed | 701/117 |

FOREIGN PATENT DOCUMENTS
DE 19857946 1/2000

* cited by examiner

*Primary Examiner* — Luke Ratcliffe
(74) *Attorney, Agent, or Firm* — Kenyon & Kenyon LLP

(57) ABSTRACT

A device for recording a geometry of an environment of a device in a detection field with the aid of laser scanning may include a laser beam controlled by an oscillating micromechanical mirror. The detection field is specifiable in the vertical and horizontal directions by adapting an amplitude of oscillation of the micromechanical mirror. Driver-assistance systems are used for tasks both in the near field, such as a parking function, and in the distant field of the vehicle, such as a distance control or the detection of obstacles on the roadway. If the amplitude of the oscillation of the micromirror is then reduced in the horizontal direction and/or vertical direction, the spatial resolution for the reduced detection range is improved. Moreover, the higher intensity of the laser radiation impinging on the smaller detection region improves the signal-to-noise ratio of the detected signal.

14 Claims, 2 Drawing Sheets

ADAPTIVE ANGLE AND POWER ADAPTATION IN 3D-MICRO-MIRROR LIDAR

FIELD OF THE INVENTION

The present invention relates to a device for recording a geometry of an environment of a device in a detection field with the aid of laser scanning using a laser beam controlled by an oscillating micromechanical mirror. The present invention further relates to a method for recording a geometry of an environment in a detection field by laser scanning with the aid of a laser beam controlled by an oscillating micromechanical mirror, the device determining a contour of the environment from the intensity, specified by a receiver, of the laser radiation backscattered or reflected from the environment, and the device determining the distance of objects in the environment from the propagation time of laser pulses.

BACKGROUND INFORMATION

To produce an image of an environment of a vehicle for a driver-assistance system, a system based on LIDAR (light detection and ranging) may be used in addition to other systems. In a LIDAR system, the environment is illuminated line-by-line by a point of light from a pulsed laser light source. A contour of the environment is determined from the amplitude or the intensity of the reflected and backscattered light. In addition, the distance to objects is determined from the propagation time of the light pulses, so that a three-dimensional image of the environment is able to be produced overall, which may be evaluated with the aid of image-processing software. The line by line scanning must take place so rapidly that a reaction time suitable for operating a vehicle is able to be realized. Micromechanical mirrors, as they are used in digital projection devices as well, constitute a suitable system for this purpose.

According to the related art, micromechanical mirrors are patterned out of a silicon wafer in a CMOS-compatible process. The created mirror surface can be deflected electrostatically or electromagnetically.

A suitable micromechanical mirror is described in DE 198 57 946 C1. DE 198 57 946 C1 describes a device in which an oscillating micro-mirror has a self-supporting mirror surface, which is at least regionally connected to a carrier element surrounding the mirror surface, via at least one torsion axis formed by a torsion beam mounted on the mirror surface. A bending beam is situated at least between a torsion beam and the carrier element, which bending beam executes a flexural vibration that induces a torsional oscillation of the minor surface about the torsion axis. The amplitude of the oscillation of the mirror surface is especially large if the device is oscillating in resonance. According to the related art, such devices are therefore operated in resonance. It is known to use a laser adjustment to bring devices of this type to identical resonant frequencies in order to compensate for tolerances stemming from the manufacturing process.

Disadvantageous in the devices and methods according to the related art is that the maximum deflection angle of the laser radiation is fixedly specified in the vertical and horizontal direction. It is therefore necessary to use the same angular range for detection tasks in the near field and the distant field. If a smaller detection field is required in the distant field, for example, then the resolution of the device—evaluated in pixels—drops in the small detection field given a constant angular resolution.

SUMMARY OF THE INVENTION

Therefore, it is an object of the present invention to provide a device and a method by which the detection field of a LIDAR system is able to be adapted to different measuring tasks.

This may be achieved, with respect to a device, in that the detection field is specifiable in the vertical and horizontal direction by adapting the amplitude of oscillation of the micromechanical mirror. Driver-assistance systems may be used both for tasks in the near field and in the distant field of the vehicle. For example, a parking function is a task in the near field, whereas a distance control or the detection of obstacles on the roadway constitutes a task in the distant field. To produce an image of the vehicle's environment for the driver-assistance system, a system based on LIDAR (light detection and ranging) may be used in addition to other systems. In the case of LIDAR, a point of light from a pulsed laser light source illuminates the environment line by line. In the process, the laser beam is deflected by a micro-mirror, which is oscillating at 24 kHz in the horizontal direction, and at 60 Hz in the vertical direction, for example, so that 60 images of the environment are produced each second. According to the related art, the mirror oscillates at a constant amplitude in both directions, so that fixed angular ranges are swept.

If such a system is adapted to the close range, then only a scaled down image section is able to be used for the distant range. In that case, the image frequently has insufficient spatial resolution because the system is operating at a constant angular resolution. If the amplitude of the oscillation of the micro-mirror is then reduced in the horizontal and/or vertical direction according to the present invention, the spatial resolution for the reduced detection range will be improved as a result.

The reflected or backscattered component of the laser radiation is used for detecting the objects. As the distance of the objects increases, or if objects have a low reflection factor, the signal-to-noise ratio becomes increasingly worse. With reduction of the amplitude of the oscillation of the micromechanical mirror according to example embodiments of the present invention, then the laser radiation is transmitted in a smaller angular range, so that the object is illuminated with greater radiation intensity. The intensity it receives and the signal-to-noise ratio are therefore greater.

In an example embodiment of the present invention, the detection field is specifiable by selecting the frequency of the control signal of the micromechanical mirror. In micromechanical mirrors, the deflection of the mirror is a function of the frequency of the control signal. At a constant amplitude of the control signal, the deflection is therefore able to be adjusted via its frequency.

In an example embodiment of the present invention, a control signal is able to be applied to the micromechanical mirror using its resonance frequency and using a frequency that deviates therefrom. Micromechanical mirrors are generally operated at their resonance frequency in order to obtain as large an oscillation amplitude as possible while expending little energy, and to achieve a large deflection angle in this manner. If a control frequency is selected that deviates from the resonance frequency, then the deflection angle is able to be reduced. For example, in the case of a micromechanical mirror used in video projection, whose resonant axis is operated in resonance at 24 kHz and which produces a deflection of ±12°, the deflection may diminish by a few degrees when the control frequency is varied by a few 10 Hz.

In an example embodiment of the present invention, a different amplitude of the control signal may be used for application to the micromechanical mirror. In the exemplary micromechanical mirror, a control signal having 60 Hz is applied to the static axis, resulting in a deflection of ±7°. If the control signal of the micromechanical mirror is adapted to the measuring task both in its frequency and its amplitude, then the deflection about the resonant axis is able to be adjusted within a range from 3% to 100%, and the deflection about the static axis within a range from 0.5% to 100%. Suitable setting of the horizontal and vertical deflection angles makes it possible to adapt the device to a measuring task in an especially advantageous manner.

The detection of objects is able to be improved by making the radiation power of the laser beam selectable as a function of the frequency and/or the amplitude of the control signal of the micromechanical mirror. When the deflection angle is reduced, this may require a reduction of the radiation power for a detection in the near field. On the other hand, a detection in the distant field may be improved by reducing the deflection angle of the micromechanical mirror and additionally increasing the radiation power of the laser radiation.

A LIDAR (light detection and ranging) system for detecting the environment of a vehicle and for driver assistance is able to be improved with regard to its suitability for detecting objects both in the near range and the distant range in that the detection field is specified in the vertical and horizontal direction via an adaptation of the amplitude of oscillation of the micromechanical mirror. Driver-assistance systems evaluate a region in front of the vehicle having twice the width of the roadway, for example. This requires a larger angular range of the LIDAR in the near range than for the distant range. By making the angular range adjustable, the system can be rapidly adapted to the individual measuring task, also temporarily while driving.

Adapting the detection field to a measuring task may be achieved in example embodiments of the present invention, with respect to a method, by specifying the frequency and/or the amplitude of a control signal of the micromechanical mirror. This makes it possible to adapt the object detection to the measuring task in the near field and in the distant field, so that the system is suitable both for a parking function and for a distance LIDAR, for example. An increase in the angular resolution is achieved by reducing the amplitude of oscillation of the micromechanical mirror. This makes it possible to analyze small objects or objects in the distant range at higher quality. The method is able to be implemented in an especially simple and cost-effective manner because it largely utilizes the available devices with an adaptation of the program control.

According to example method of the present invention, the detection field is adapted according to the vehicle status data, such as the vehicle's own speed, steering angle, brake status or a status of an electronic stability program (ESP), or according to positional data including map information, or according to a combination of at least two of the previously mentioned items of information. Adapting the detection angle according to the motor vehicle's own speed improves the detection of objects lying far away straight-ahead driving at high speed. If the steering angle is taken into account, then the detection angle is able to be increased at large steering deflections, thereby making it possible to detect objects lying in the estimated travel path of the vehicle but which would not be detected at a small detection angle. If positional data, e.g., from a global positioning system (GPS), as well as map data are taken into account as well, then it is possible to restrict the detection angle for straight travel paths lying ahead, in order to detect objects lying far ahead, while, for upcoming curves, the detection angle is able to be enlarged to broaden the scanning field in order to include the edge of a curved road stretch as well.

If the detection field is reduced in order to detect objects far away, then the power of the laser radiation is focused, so that an improved signal-to-noise ratio comes about. In addition, the reduction of the detection field results in an improved spatial resolution.

A further improvement in the signal-to-noise ratio in the detection of objects lying far away can be achieved by increasing the intensity of the laser radiation in order to detect objects lying far ahead.

BRIEF DESCRIPTION OF THE DRAWINGS

The drawings illustrate generally, by way of example, but not by way of limitation, an example embodiment of the present invention discussed in detail in the following description.

DETAILED DESCRIPTION

Figure 1:
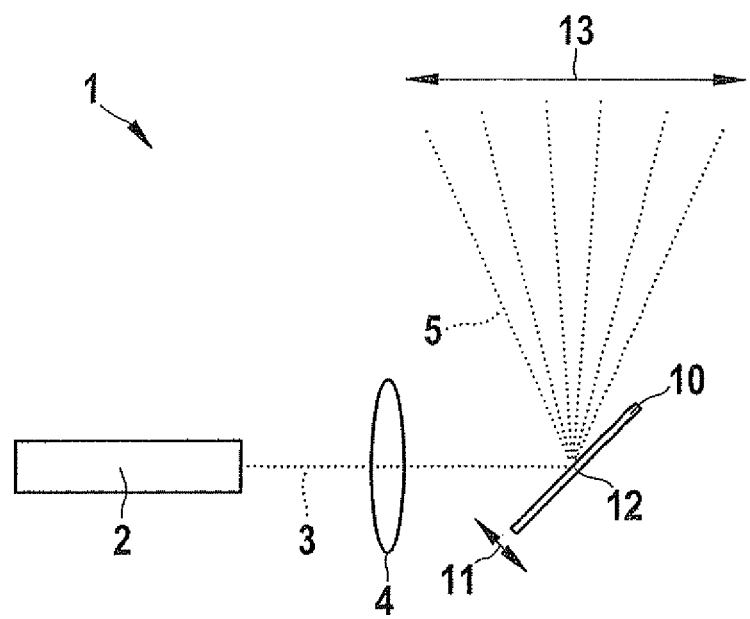
FIG. 1 illustrates schematically a deflection of a laser beam by a micromechanical mirror in an operation at the resonance frequency, according to an example embodiment of the present invention.

FIG. 1 schematically illustrates a LIDAR system 1 for recording the geometry of the environment of a motor vehicle. Using a laser 2, a laser beam 3 is produced, which is shaped via a focusing lens 4 and forwarded to a micromechanical mirror 10. Micromechanical mirror 10 is rotatable about an axis of rotation 12 situated perpendicular to the drawing plane, so that its circumference is able to execute a periodic mirror motion 11. Micromechanical mirror 10 may be driven electrostatically or electromagnetically. When controlled at its resonance frequency by a specified control signal, it executes an oscillating mirror motion 11, so that a scanning beam 5, which is formed by laser beam 3 reflected at micromechanical mirror 10, sweeps a first scanning region 13.

Figure 2:
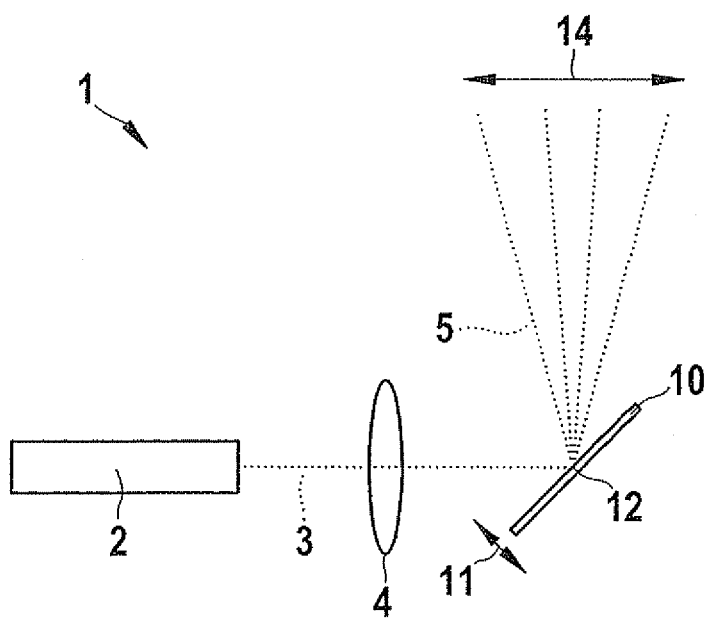
FIG. 2 illustrates schematically a deflection of a laser beam by a micromechanical mirror in an operation at a frequency that deviates from the resonance frequency, according to an example embodiment of the present invention.

FIG. 2 shows the LIDAR system 1 of FIG. 1 when controlled at a frequency that deviates from the resonance frequency, or by a control signal having a reduced amplitude. Laser beam 3 emitted by laser 2 is shaped by focusing lens 4 and forwarded to micromechanical mirror 10. Reflected laser beam 3 forms scanning beam 5. The control of micromechanical mirror 10 at a frequency that deviates from its resonance frequency results in a reduced mirror motion 11 about axis of rotation 12. As a result, scanning beam 5 sweeps a second scanning region 14, which is smaller than first scanning region 13 illustrated in FIG. 1. A reduction of mirror motion 11 is also achievable via a control signal of micromechanical mirror 10 that is reduced in amplitude in comparison with the illustration in FIG. 1. The LIDAR system 1 resolves a specified number of pixels, regardless of the size of scanning region 13, 14. When scanning region 13, 14 is reduced, the spatial resolution rises as a result, and small objects or objects located far away are able to be reproduced at a higher resolution. Reducing scanning region 13, 14 additionally causes scanning beam 5 to sweep a smaller area and illuminate it with a greater intensity. This may be utilized to improve the signal-to-noise ratio in the evaluation. In driving operation, scanning regions 13, 14 may be adapted continuously, it being possible to detect objects lying at a distance by increasing the radiation power of laser 2 in addition. In the near range, it may be advantageous to reduce the radiation power of laser 2.

Figure 3:
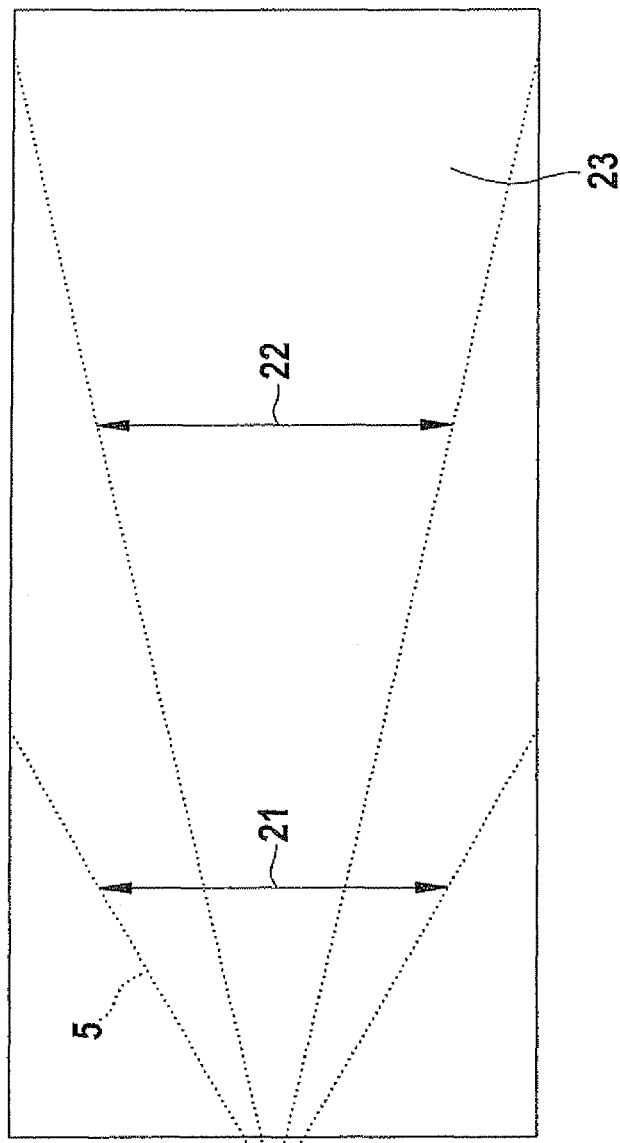
FIG. 3 illustrates schematically an adaptation of the angular range of a LIDAR for a driver-assistance system, according to an example embodiment of the present invention.

FIG. 3 schematically shows the LIDAR system 1 mounted in the front region of a passenger car 20. The LIDAR system 1 is used to detect objects in a scanning field 23 in front of passenger car 20. Scanning field 23 may typically be set for twice the width of the roadway. A detection in the near range requires scanning beam 5 to sweep a first angular range 21. If objects farther ahead are to be detected, then it is advantageous to restrict scanning beam 5 to a second scanning range 22 in order to achieve an improvement in the light intensity and spatial resolution in the entire scanning field 23.

What is claimed is:

1. A device for recording a three-dimensional image of an environment of a device in a detection field with the aid of laser scanning, comprising:
   an oscillating micromechanical mirror that oscillates in a vertical direction and a horizontal direction;
   a laser beam controlled by the oscillating micromechanical mirror; and
   an arrangement via which to specify the detection field in the vertical direction and the horizontal direction by adapting, in both the vertical and the horizontal directions, at least one of an amplitude of oscillation of the micromechanical mirror and an oscillation frequency of the micromechanical mirror.

2. The device as recited in claim 1, wherein the device is configured such that a control signal is able to be applied to the micromechanical mirror at its resonance frequency and at a frequency that deviates from its resonance frequency.

3. The device as recited in claim 1, wherein the device is configured for varying a control signal applied to the micromechanical mirror.

4. The device as recited in claim 1, wherein the device is configured for selection of a radiation power of a laser that generates the laser beam, the selection of the radiation power occurring as a function of at least one of a frequency and an amplitude of a control signal of the micromechanical mirror.

5. A method for recording a geometry of an environment in a detection field with the aid of laser scanning using a device including a laser beam controlled by an oscillating micromechanical mirror that oscillates in a vertical direction and a horizontal direction, the device determining three-dimensional information describing the environment from an intensity, specified by a receiver, of laser radiation backscattered or reflected from the environment, and the device determining a distance of objects in the environment from a propagation time of laser pulses, the method comprising:
   specifying the detection field by an adaptation of an amplitude of oscillation of the micromechanical mirror in the vertical direction and the horizontal direction.

6. The method as recited in claim 5, wherein the detection field is adapted to a measuring task by specifying at least one of a frequency and an amplitude of a control signal of the micromechanical mirror.

7. The method as recited in claim 5, wherein the detection field is adapted according to at least one of a vehicle status data and a positional data.

8. The method as recited in claim 7, wherein the vehicle status data includes at least one of a velocity of a vehicle in which the device is integrated, a steering angle, a brake status, and a status of an electronic stability program (ESP).

9. The method as recited in claim 8, wherein the positional data includes map information.

10. The method as recited in claim 7, wherein the positional data includes map information.

11. The method as recited in claim 5, wherein a first detection field is used for detection of objects at a first distance, and a second detection field reduced from the first detection field is used for detection of objects at a second distance farther away than the first distance.

12. The method as recited in claim 5, wherein a first intensity of the laser radiation is used for detection of objects at a first distance, and a second intensity of the laser radiation increased from the first intensity is used for detection of objects at a second distance farther away than the first distance.

13. The method as recited in claim 11, wherein the first detection field and the second detection field are located in front of the vehicle, and the adaptation of the amplitude of oscillation of the micromechanical mirror causes the detection field to be switched between the first detection field and the second detection field.

14. The device as recited in claim 2, wherein the resonance frequency of the micromechanical mirror is fixed.

* * * * *